US008362893B2

(12) United States Patent
Ishikawa

(10) Patent No.: US 8,362,893 B2
(45) Date of Patent: Jan. 29, 2013

(54) DISPLAY DEVICE FOR CARGO-HANDLING VEHICLES

(75) Inventor: Naoki Ishikawa, Sagamihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 439 days.

(21) Appl. No.: 12/680,860

(22) PCT Filed: Apr. 21, 2009

(86) PCT No.: PCT/JP2009/058231

§ 371 (c)(1),
(2), (4) Date: May 13, 2010

(87) PCT Pub. No.: WO2009/131235

PCT Pub. Date: Oct. 29, 2009

(65) Prior Publication Data

US 2010/0238010 A1 Sep. 23, 2010

(30) Foreign Application Priority Data

Apr. 25, 2008 (JP) ................................ 2008-115338

(51) Int. Cl.
*B60Q 1/00* (2006.01)

(52) U.S. Cl. ..................... 340/440; 187/222; 340/425.5; 340/438; 340/439; 701/50

(58) Field of Classification Search ............... 340/425.5, 340/429, 438, 439, 440, 441, 457, 463; 701/50; 477/169, 171, 172, 173, 175; 187/224, 222, 187/223; 414/667
See application file for complete search history.

(56) References Cited

U.S. PATENT DOCUMENTS 4,511,974 A * 4/1985 Nakane et al. ................ 701/124
7,524,268 B2 * 4/2009 Oka et al. ...................... 477/169
2008/0201044 A1 * 8/2008 Yamada et al. ................ 701/50

FOREIGN PATENT DOCUMENTS

JP 63-63920 A 3/1988
JP 63-91523 A 4/1988
JP 5-260605 A 10/1993

(Continued)

*Primary Examiner* — Brent Swarthout
(74) *Attorney, Agent, or Firm* — Birch, Stewart, Kolasch & Birch, LLP

(57) ABSTRACT

The issue is to show displayed items on a display device of a cargo-handling vehicle, where only a display device having a small display space can be used, so that operations accompanying the operating sequence of the cargo-handling vehicle can be performed. The device has a tilt angle sensor, which detects forward tilt or backward tilt by a mast provided at the front of the cargo handling vehicle, a hydraulic pressure sensor, which measures the supply hydraulic pressure to a lift cylinder that is provided on the mast and raises and lowers a fork, and a calculation unit, which converts the cylinder supply hydraulic pressure detected by said hydraulic pressure sensor to the weight of the cargo loaded on the aforementioned fork. A selection display area is also provided, which selectively displays the tilt angle and the weight in the same location outside of the vehicle speed display area. When the vehicle's power is turned on and the tilt angle sensor detects forward tilt or backward tilt continuing for a predetermined period of time when the aforementioned mast is tilting forward or tilting backward, the tilt angle is displayed. When the application of pressure in a direction to raise the fork is detected, continuing for a predetermined period of time, the weight of the loaded cargo calculated by the calculation unit is displayed, with priority given to display of the tilt angle.

15 Claims, 5 Drawing Sheets

FOREIGN PATENT DOCUMENTS

| | | | |
|---|---|---|---|
| JP | 5-286700 | A | 11/1993 |
| JP | 6-67158 | U | 9/1994 |
| JP | 2003-63277 | A | 3/2003 |
| JP | 2003-173210 | A | 6/2003 |
| JP | 2003-267699 | A | 9/2003 |

* cited by examiner

DISPLAY DEVICE FOR CARGO-HANDLING VEHICLES

BACKGROUND OF THE INVENTION

1. Technical Field

The present invention relates to a display device for cargo-handling vehicles, especially for vehicles with a small display device having a small display due to limited space for installing the display device, such as a forklift, in which0 the limited display space can be utilized and the display device displays items in an operation sequence of the cargo-handling vehicle.

2. Description of the Related Art/Background Art

A schematic structure of a forklift as a cargo-handling vehicle shown in FIG. 4 has a vehicle body 72 equipped with front wheels 70 and rear wheels 71, a fork 73 for loading a cargo 86, and a mast consisting of an outer mast 74 and an inner mast 75 for raising and lowering the fork 73, and being provided at the front of the vehicle body 72.

The fork 73 is installed on the mast via lift brackets 76, and the fork is constructed in such way that the outer mast 74 is capable of controlling a position of the cargo 86 forward and backward by tilting the fork 75 forward or backward (tilting operation), and the inner mast 75 being fixed to the top part of the outer mast 74 and being connected to the lift brackets 76 via rails, so as to move the fork 73 having the cargo 86 loaded thereon and the lift bracket 76 in the vertical direction along the rail (lifting operation) by the outer mast 74 and inner mast 75.

The outer mast 74 is capable of controlling the tilt angle around a supporting axis of the outer mast 74 by a tilt cylinder 77. The lift bracket 76 is constructed to move in the vertical direction on the rail of the inner mast 75 via a chain wheel 79 and a chain 80 with the vertical movement of a lift cylinder 78. Thus, the fork 73 for loading the cargo 86 thereon connected to the tip of the lift bracket 76, can be controlled to move forward and backward and up and down A tilt angle sensor 81 such as a potentiometer, which detects change of the tilt cylinder 77, is provided on the tilt cylinder 77. And a lift sensor such as a wire-type displacement sensor 82, which detects change of the lift cylinder 77 in the vertical direction, is provided on the lift cylinder 78. A hydraulic pressure sensor 85 which measures the hydraulic pressure of the oil being supplied to the lift cylinder 78, is provided on a hydraulic pipe 84 filled with oil 83*b* for pressurizing the lift cylinder 78. With this structure, the hydraulic pressure in the direction to raise the fork 73 is converted to the weight of the cargo, so as to measure the weight of the cargo 86 loaded on the fork 73.

FIG. 5 is a perspective view of a driving unit of a forklift as a cargo-handling vehicle. The figure shows a handle 90, a display unit 91 for displaying speed, fuel gage, weight of the loaded cargo 86, tilt angle of the mast and the like, a forward-backward lever 92 for shifting gears between forwarding and reversing, a parking-brake lever 93, a lift lever 94 for raising and lowering the fork 73, a tilt lever 95 for controlling the position of the cargo 86 loaded on the fork 73 forward and backward by tilting the mast forward or backward, a brake pedal 96 and an accelerator pedal 97.

FIG. 6 is a diagram to explain an example of operation sequence for moving the cargo 86 by the forklift 72 as a cargo-handling vehicle. As shown in FIG. 6(A) which is a preparation state before loading the cargo 86, the tilt lever 95 is pulled and the mast is tilted backward so as to raise the fork 73 by 15 to 20 cm from the ground. In the state, the forklift 72 drives to the location where the cargos 86 are placed. Next, as shown in FIG. 6(B) the forklift 72 stops where the distance between the front tip of the fork 73 and the cargos 86 is about 20 to 30 cm and the parking-brake lever 93 being pulled to a lock position.

As shown in FIG. 6(C), the mast tilted by operation of the tilt lever 95 is returned to an upright position and being lifted by operation of the lift lever 94 to the same height as an insertion gap of pallets. In the state, as shown in FIG. 6(D), the parking-brake lever 93 is released, the forward-backward lever 92 being moved so as to the forwarding position to move the forklift slowly forward, the fork 73 being inserted between the pallets, the forklift 72 stopping and the parking brake 93 being moved to the lock position.

Next, as shown in FIG. 6(E), the cargo 86 is lifted by about 10 cm with operation of the lift lever 94, and as shown in FIG. 6(F) the tilt lever 95 is pulled so as to tilt the mast backward for a stable transportation of the cargo. In the state, the forward-backward lever 92 is moved to the reverse position, the parking-brake lever 93 being released, the forklift backing up to the location where the cargo 86 can be safely unloaded.

Then, the forklift stopping about 20 to 30 cm away from the stack of remaining cargos 86, the parking-brake lever 93 being locked, and the lift lever 94 being operated as to lower the fork 73 so that the bottom of the fork 73 is about 15 to 20 cm off the ground as shown in FIG. 6(G). In the state, as shown in FIG. 6(H) the forward-backward lever 92 is moved to the reverse position, the parking-brake lever 93 being released so as to back up the forklift to the location where the forklift can safely change the direction, and then the forklift moving to a destination such as to a truck.

These are examples of the schematic structure of the forklift as a cargo-handling vehicle and operation examples of moving the cargos. With this type of forklift, in the case of loading the cargos 86 onto a truck it is preferable to display the weight of the cargo loaded on the forklift while lifting the cargo 86 so as to avoid the total weight of the cargos exceeding the maximum allowable weight of the truck. Moreover, when an entry-level operator operates the forklift, it is hard to visibly confirm a forward or backward tilt of the mast (tilt angle), and thus display of current state of the tilt angle is desired.

In this case, a passenger vehicle has a sufficient space for a display device displaying a variety of information such as vehicle speed, engine rotation, fuel gage, shift lever position, engine coolant temperature, a traveling distance, a light operation mode, an operation mode of a windshield wiper, turn-signal signs, an operation mode of air-conditionings, indoor temperature and the like. However, in a cargo-handling vehicle such as a forklift, visibility from the front is important and as shown in FIG. 5, the display device 91 can only be installed in a small space such as on a front side of the vehicle body with respect to a steering wheel 90, and thus only a small display device with a small display can be installed.

In order to display essential pieces of information in a display device with limited space, Patent Reference 1 (JP5-260605A) proposes a monitor device with alert indications in which when any abnormality is detected in the vehicle, the display is automatically switched to a alarm display showing contents of the abnormality along with alarm, the alarm being turned off by pressing a confirmation key, and the display being returned to a normal display or switched to a detailed display of the abnormality so as to provide sufficient information.

Patent Reference 2 (JP6-67158A) discloses a display device for a vehicle in which for the purpose of easy confirmation of conditions of the vehicle, a multi-display is provided adjacent to a speed indicator which is always on and normally displays a rotation speed of the engine but switched to a warning indication upon receiving signals from a variety of warning sensors in the case of detecting any defects. In a similar manner, the display is changed when a shift lever, light switch or radio switch is turned on.

Furthermore, Patent Reference 3 (JP2003-173210A) proposes a display device in an operating machine such as a combine, in order to display plural types of abnormal information in a LCD display device provided in the combine for easy confirmation of the displayed information. The proposed display device has a CAN controller which shows each piece of the abnormal information sequentially on LCD display panel.

However, all of the display devices disclosed by the cited references have a limited space for a display. The display device of Patent Reference 1 switches the normal display to the alert display indicating details of the detected abnormality. The display device disclosed in Patent Reference 2 switches the display in the case of detecting defects of the parts or operation the shift lever, light switch and radio switch. The display device of Patent Reference 3 switches the display sequentially to show information of abnormality. However, there is no indication of displaying warnings in such a case that an entry-level operator operates the vehicle without following the operation sequence as described above such as driving the forklift while the fork 73 is upright or the mast is tilted forward and the tip of the fork 73 is barely off the ground.

Therefore, an object of the present invention is to provide a display device of a cargo-handling vehicle such as a forklift which can use only a display device with a small display due to a limited space to install the device, wherein the small display space is fully utilized and the operation steps of the cargo-handling vehicles are sequentially displayed in the order of the operation.

SUMMARY OF THE INVENTION

In order to achieve the object, the present invention proposes a display device for a cargo-handling vehicle which has a mast located at a front of the vehicle, the mast being capable of tilting a fork forward and backward around a support axis and moving the fork up and down, a tilt-angle detector detecting a tilt angle of the mast, and a cargo weight detector detecting weight of a cargo loaded on the fork, the display device comprising:

a display which displays speed of the cargo-handling vehicle, the tilt angle of the mast and the cargo weight; and a control unit which controls the display, wherein the display includes a speed display area displaying the speed of the cargo-handling vehicle and a selection display area which selectively displays the tilt angle and the weight outside the speed displaying area, wherein the control unit controls the display so that contents of the selection display area are changed depending on driving states of the cargo-handling vehicle including an initial driving state from turning on the cargo-handling vehicle to starting the vehicle, a slow driving state from staring the vehicle to reaching a prescribed speed and a normal driving state when the vehicle drives at the prescribed speed or higher, and wherein at least in the initial driving state, the selection display area displays the tilt angle detected when turning on the vehicle, and in the normal driving state, the selection display area displays only error indications.

In this manner, the tilt angle and the cargo weight are displayed in the same area, i.e. the selection display area, and the tilt angle is displayed in the initial driving state so that the display device displays the fork being upright or tilted with the tip thereof barely off the ground when the cargo-handling vehicle is turned on. This allows the operator to recognize any existing problem before driving the vehicle and prompts the operator to drive in the order of the operating sequence as shown in FIG. 6.

As the tilt angle and the cargo weight are selectively displayed in the selection display area, both of the tilt angle and the cargo weight can be displayed when only the display device with a small display can be used, which allows easy understanding of the total weight of the cargos loaded on the vehicle such as a truck by adding the cargo weights displayed in the selection display area.

Furthermore, in the slow driving state, the selection display area displays either the tilt angle being currently detected by the tilt-angle detector or the cargo weight being detected by the cargo weight detector, and the control unit controls the selection display area so as to display the tilt angle in priority to the cargo weight, the selection display area switching from the tilt angle to the cargo weight only when the cargo-weight detector detects a change of the cargo weight not less than a prescribed value.

When using a cargo-handling vehicle such as a forklift which normally does not have suspension, vibration from the ground is directly passed to the fork and the change of the tilt angle or the cargo weight may be momentarily detected due to the vertical movement of the loaded cargo from the vibration. However, the selection display area displays the tilt angle or the cargo weight only in the slow driving state when the vibration is small, and displays the cargo weight only when the change of the cargo weight is not less than a prescribed value, and thus there is no displaying incorrect tilt angle or cargo weight in spite of influence of the vibration.

Furthermore, only the error indications are displayed in the normal driving state, and displaying of the tilt angle or the cargo weight is needed only in the initial driving state and when the cargo being loaded and not needed until the cargo being loaded onto a truck or being unloaded onto another location. Thus, when returning from the normal driving state to the slow driving state, if one of the tilt angle and the cargo weight changes, the control unit controls the selection display area so as to display the one of the tilt angle and the cargo weight. With this configuration, only the display of the changed one is needed when the cargo is loaded onto the truck or unloaded onto another location, when returning from the normal driving state to the slow driving state, or when the vehicle stops. The display device shows only essential information when needed.

Furthermore, the tilt angle displayed in the selection display area includes an image representing the tilt angle of the fork so as give the operator intuitive acknowledgement of the tilt angle (forward tilt or backward tilt).

And the error indications are given the priority in any case of the initial driving state, the slow driving state or the normal driving state so that error indications can be displayed in the cases of failure of the control unit such as CPU or failure of components such as the coolant temperature rising and hydraulic pressure drastically declining without providing a separate display area for the error indications.

Moreover, the tilt angle displayed in the selection display area during the slow driving state is updated when a change component of a tilt-angle signal from the tilt-angle detector exceeds a prescribed threshold, or the tilt angle displayed in the selection display area during the slow driving state is updated when the tilt-angle detector keeps detecting the tilt angle not less than a prescribed value for a predetermined period of time. When using a cargo-handling vehicle such as a forklift which normally does not have suspension, vibration from the ground is directly passed to the fork and the tilt angle may be momentarily changed due to the vertical movement of the loaded cargo from the vibration. However, the tilt angle is updated when a change component of a tilt-angle signal from the tilt-angle detector exceeds a prescribed threshold or when the tilt-angle detector keeps detecting the tilt angle not less than a prescribed value for a predetermined period of time. Thus, the change of the tilt angle when the operator operates the tilt lever can be distinguished from the change of the tilt angle due to the vibration from the ground, and it is possible to display a correct tilt angle.

And the cargo weight detector includes a hydraulic sensor which calculates the cargo weight from the hydraulic pressure moving the fork. The cargo-handling vehicle normally has a hydraulic cylinder controlled by the hydraulic pressure pump so as to move the fork, and the hydraulic pressure is monitored by the hydraulic pressure sensor. The cargo weight and the hydraulic pressure are in relation to each other and the cargo weight can be measured from the hydraulic pressure. Thus, the weight of the loaded cargo can be measured without providing a separate measuring device for measuring the cargo weight.

In the similar manner as determining the tilt angle, the cargo weight displayed in the selection display area is determined based on the hydraulic pressure detected for a predetermined period of time, the hydraulic pressure corresponding to a static load of the cargo received on the fork, and also the display is switched to the loaded cargo weight when the cargo-weight detector keeps detecting the change of the cargo weight not less than a prescribed threshold for a predetermined period of time. As the static load of the cargo received on the fork is determined when the change of the cargo weight not less than a prescribed threshold is detected, the change of the cargo weight when the operator operates the lift lever can be distinguished, and there is no error in displaying the cargo weight.

Accordingly, if only the display device with a small display can be installed due to the limited space, the display device for a cargo-handling vehicle of the present invention can display the tilt angle in the initial driving state when the cargo-handling vehicle is turned on, so as to prompt the operator to drive in the correct operation sequence if there is a problem with driving the vehicle in the indicated state of the fork. And the selection display area switches from the tilt angle to the cargo weight when the cargo is lifted so as to promote easy understanding of the total weight of the cargos being loaded onto a vehicle such as a truck. Additionally, the tilt angle or the cargo weight is displayed only in the initial driving state and the slow driving state so it is possible to display the correct tilt angle or the cargo weight in spite of influence of the vibration.

Furthermore, the tilt angle or the cargo weight is displayed when a change component of a tilt-angle signal from the tilt-angle detector exceeds a prescribed threshold, or the tilt angle displayed in the selection display area during the slow driving state is updated when the tilt-angle detector keeps detecting the tilt angle not less than a prescribed value for a predetermined period of time. Thus, the change of the tilt angle or the cargo weight when the operator operates the tilt lever or the lift lever can be distinguished from the change of the tilt angle or the cargo weight from the influence of the vibration directly passed to the fork so it becomes possible to display the tilt angle or the cargo weight without an error.

DETAILED DESCRIPTION OF THE INVENTION

Hereafter, the present invention will be described in detail with reference to the embodiments shown in the figures. However, the dimensions, materials, shape, the relative placement and so on of a component described in these embodiments shall not be construed as limiting the scope of the invention thereto, unless especially specific mention is made.

First Embodiment

Figure 1A:
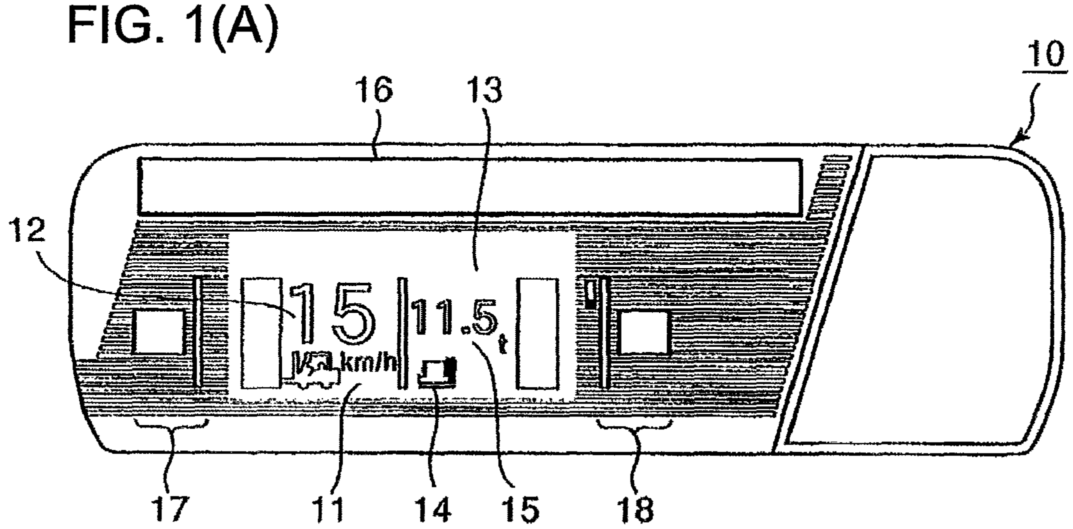
FIG. 1(A) is a front view of a display device for a cargo-handling vehicle of the present invention.
Figure 1B:
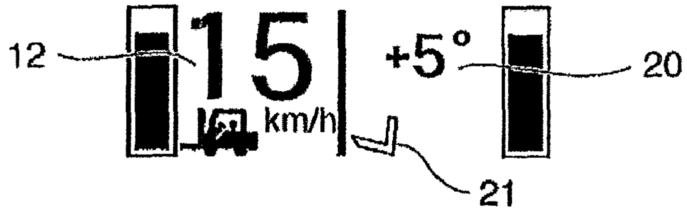
FIG. 1(B) shows a display displaying a tilt angle, FIG. 1(C) showing tilt symbols, and FIG. 1(D) showing a display displaying the weight of a loaded cargo.
Figure 1C:
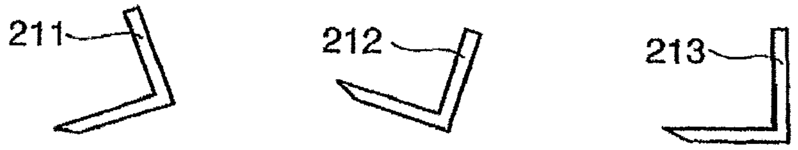
Figure 1D:
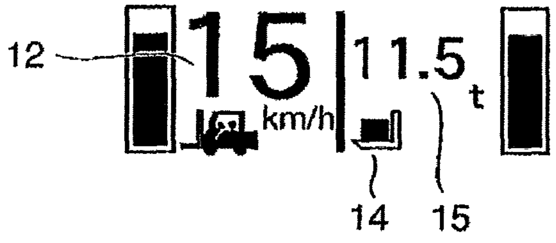

FIG. 1 (A) is a front view of a display device for a cargo-handling vehicle of the present invention, and FIG. 1 (B) shows a display displaying a tilt angle, FIG. 1(C) showing tilt symbols, and FIG. 1 (D) showing a display displaying the weight of a loaded cargo.

FIG. 1 shows a display device 10, a numerical display area 11 which uses liquid crystal display and displays numerical data, vehicle speed 12, weight symbol 14 indicating the cargo is loaded, weight 15, a display area 16 for displaying warning or caution symbols, a first indicator 17 for displaying marks such as fuel gage, and a second indicator 18 for displaying marks such as coolant temperature. The area in which the weight symbol 14 and the weight 15 are displayed is a selection display area which also selectively displays the tilt angle 20 and a tilt angle image 21 which indicates an angle change of a mast by predetermined angle as shown in FIG. 1 (B).

FIG. 1 (B) illustrates an enlarged image of a mode when the tilt symbol is displayed next to the display area displaying the vehicle speed. Shown in the figure are the tilt angle 20 and the tilt symbol 21, the tilt symbol 21 having three symbols, a forward tilt symbol 211, backward tilt symbol 212 and neutral symbol 213 as shown in FIG. 1(C). FIG. 1 (D) illustrates an enlarged image of a loaded symbol of the cargo, weight 15, the weight symbol 14, and the vehicle speed 12.

Figure 2:
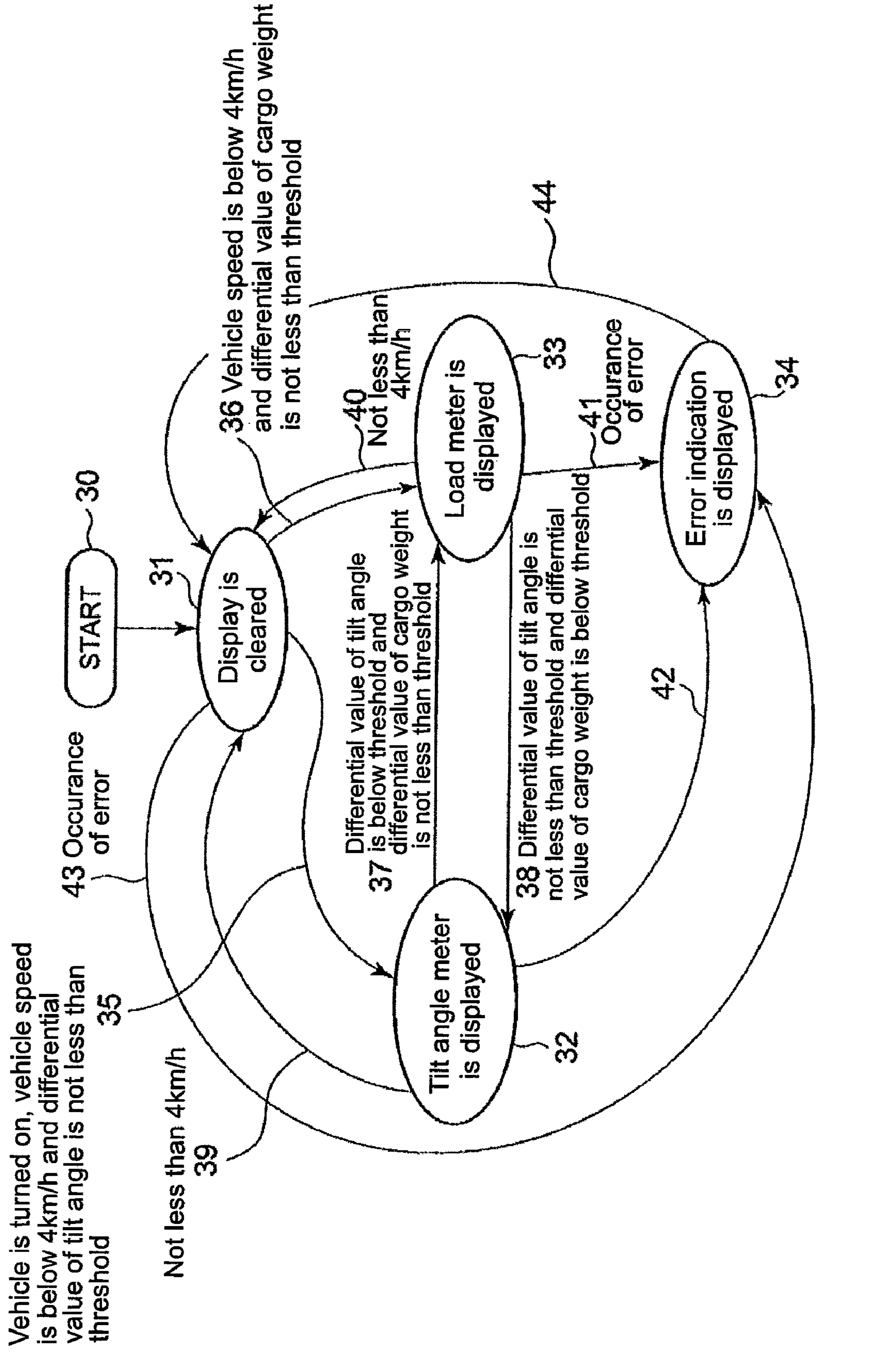
FIG. 2 is a transition diagram of displaying tilt symbols, tilt angle, load symbols or load weight displayed in the display device for the cargo-handling vehicle of the present invention.
Figure 3:
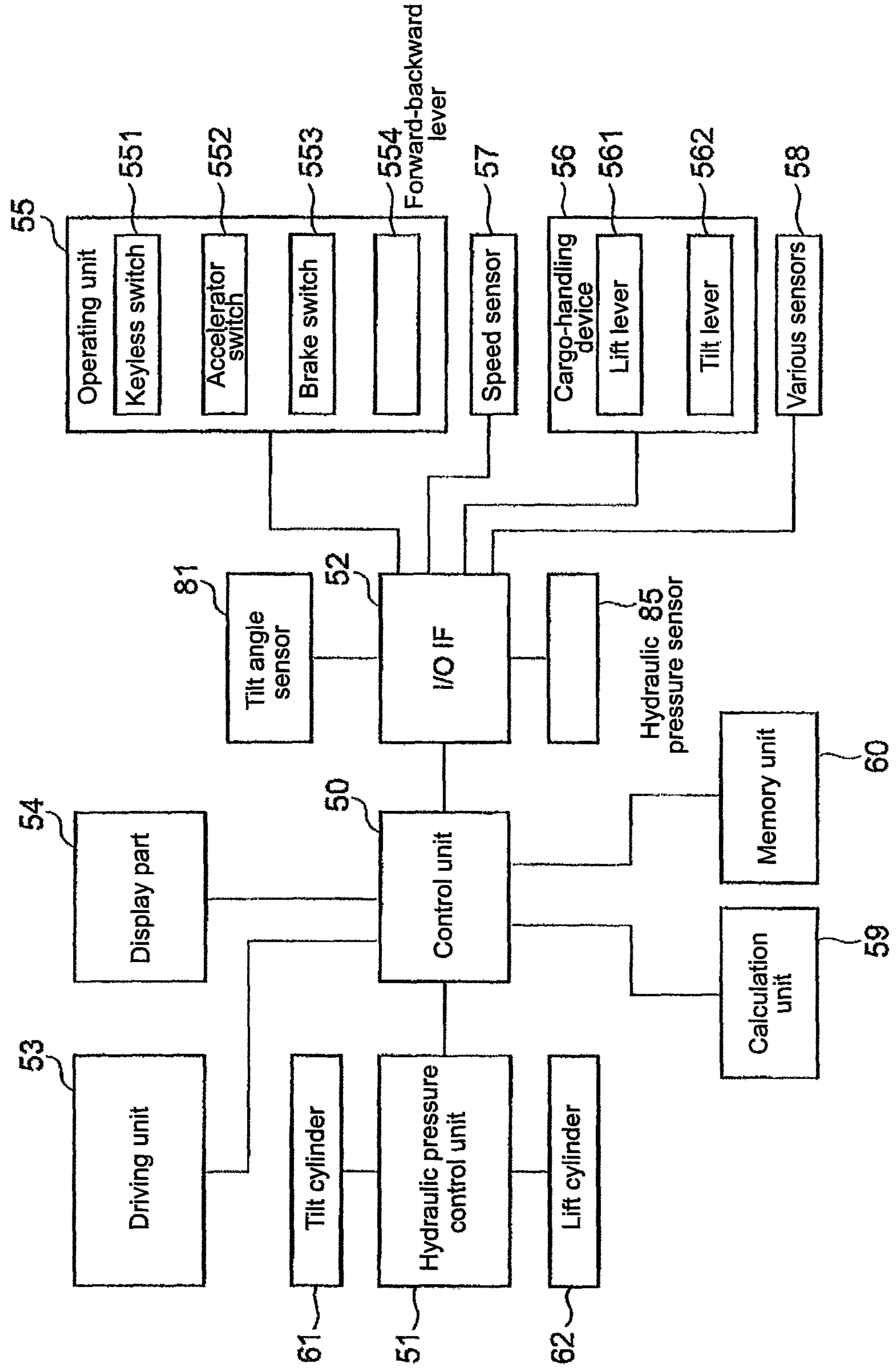
FIG. 3 is a control block diagram for displaying in the display device for the cargo-handling vehicle of the present invention.

FIG. 2 is a transition diagram of displaying the tilt symbols and the tilt angle as shown in FIG. 1 (B) and FIG. 1(C), and the load symbols and the load weight as shown in FIG. 1 (D). FIG. 3 is a control block diagram for displaying on a display unit for a cargo-handling vehicle of the present invention.

Figure 4:
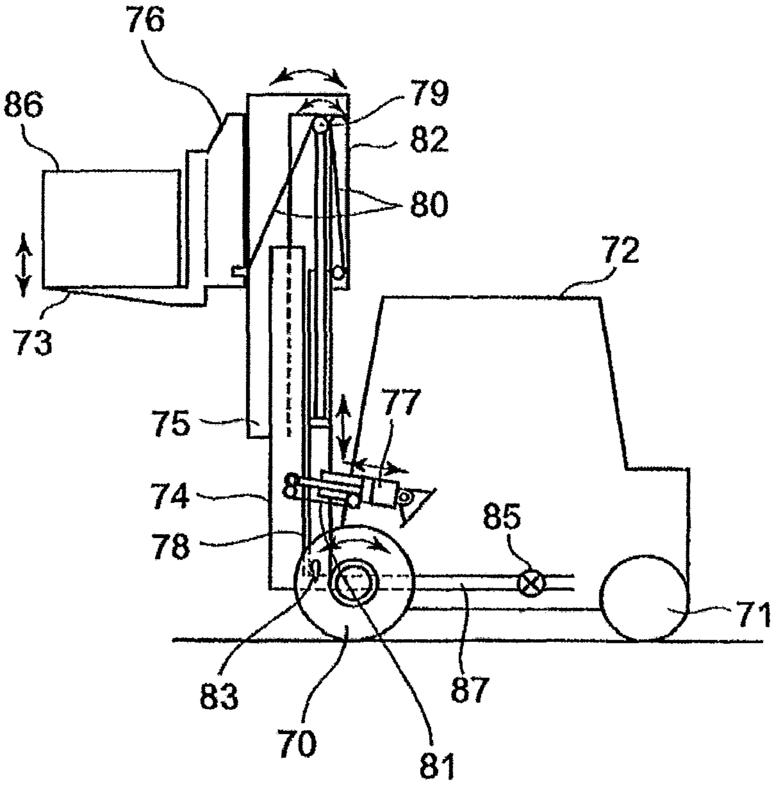
FIG. 4 illustrates a schematic structure of a forklift as a cargo-handling vehicle as an example.
Figure 5:
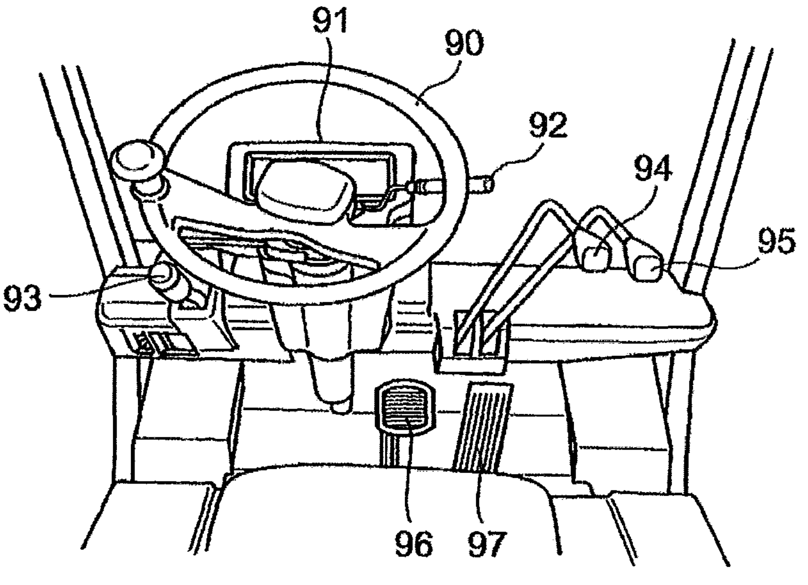
FIG. 5 shows an example of a driving device of the forklift as a cargo-handling vehicle.

The control block diagram of FIG. 3 will be briefly explained before explaining the transition diagram of FIG. 2. FIG. 3 shows a control unit 50 which controls the cargo-handling vehicle including display control of the display unit having CPU, memory and the like; a hydraulic pressure control unit 51 for cargos; I/O interface 52 which sends to the control unit 50 signals from a keyless switch 551, an accelerator switch 552, a brake switch 553, and a forward-backward lever 554 (shown as 92 in FIG. 5) constituting an operation unit 55, and from a lift lever 561 and a tilt lever 562 constituting a cargo-handling device 56, and from a speed sensor 57 for detecting the vehicle speed, various sensors 58, a tilt angle sensor 81, and a hydraulic pressure sensor 85; a driving unit 53 including front wheels 70 and rear wheels 71 (shown in FIG. 4) as well as an engine, a gear case, and a brake those which are not shown in the drawings; an display part 54 shown in FIG. 1; a calculation unit 59; a memory unit 60 which stores various data; a tilt cylinder 61 shown as 77 in FIG. 4; and a lift cylinder 62.

Next, the transition diagram of FIG. 2 will be explained in reference to FIG. 3. When the key switch 551 of the operation unit 55 is turned on and the vehicle starts as indicated with 30 in FIG. 2, the selection display area of the display device 10 is cleared as indicated with 31 during an initial driving state. In FIG. 1 (A), the selection display area displaying the weight symbol 14 and the weight 15 in the display device 10 is the selection display area for the tilt angle and weight where the weight symbol 14 and the weight 15 or the tilt angle 20 and the tilt symbol 21 are displayed.

Subsequently, the tilt angle sensor 81 detects an initial tilt-angle state of the tilt cylinder 61, the detection signal being sent to the control unit 50 via I/O interface 52. Then, the control unit 50 moves on as shown by arrow 35 of FIG. 2 to display the tilt angle meter as shown by 32 in FIG. 2, and the initial tilt-angle 20 as shown in FIG. 1 (B) as well as an appropriate tilt symbol 21 selected from the symbols shown in FIG. 1(C) are displayed in the display unit 54. Thus, as the display unit 54 displays when the fork 73 is upright or the front tip of the fork 73 is barely off the ground while driving, the operator can view the display and recognize that there is a problem in driving the vehicle, and is prompted to drive according to the operation sequence explained in FIG. 6.

As illustrated in FIG. 6 (A), in the preparation state before moving the cargo 86, the tilt lever 562 (shown as 95 in FIG. 5) is pulled and the mast is tilted backward causing the tilt angle to change from the initial state. When the tilt angle sensor 81 detects forward tilt or backward tilt of the mast over predetermined value, specifically detecting the change of the tilt angle continuing for a predetermined period of time, or when a differential value calculated from the detected value from the tilt angle sensor 81, specifically the displacement value, is not less than a prescribed threshold, the tilt angle is displayed. And when a differential value calculated from the value detected by the tilt angle sensor 81, specifically a displacement value, is not less than a prescribed threshold, the tilt angle is displayed in the selection display area which selectively displays the tilt angle and the cargo weight.

In this process, the tilt lever 562 (shown as 95 in FIG. 5) of the cargo-handling device 56 is operated so that the control unit 50 sends the signal to the hydraulic pressure control unit 51 and the hydraulic pressure is applied to the tilt cylinder 61 so as to tilt the mast backwards. Then, the tilt angle sensor 81 detects the change of the tilt angle, sending the detection signal to the control unit 50 via the I/O interface 52. The control unit 50 sends the detection signal to the calculation unit 59 so as to calculate a differential value, i.e. a displacement value, and compares the displacement value with a threshold stored in the memory unit 60. If the displacement value is not less than the threshold, the control unit 50 further refers to the vehicle speed being sent from the speed sensor 57 and displays an appropriate mode on the display unit 54. For example, the vehicle speed is below 4 km/hr and a main machine (engine or motor) is turned on, the control unit 50 determines the slow driving state, thereby displaying on the display 54 the tilt angle and the backward-tilt symbol which are shown as 20 and 212 in FIG. 1 (B) and FIG. 1(C) respectively.

Now the fork 73 is about 15 to 20 cm off the ground, and the parking-brake lever 93 being released, the forward-backward lever 554 is moved to the forward position, the accelerator switch 552 being turned on by stepping on the accelerator pedal 97, and the vehicle moving forward to the location of the cargos. In this process, once the speed sensor 57 indicates the vehicle speed being not less than a prescribed speed, e.g. 4 km/hr or above as indicated with arrow 39, it is determined that the vehicle is back in the normal driving mode and the tilt angle is cleared as indicated as 31 in FIG. 2. The step of clearing the display is also performed in the case of displaying the weight as indicated with arrow 40.

Figure 6A:
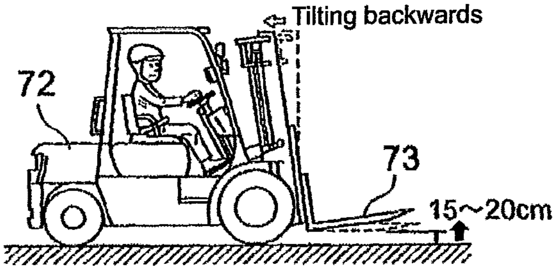
FIG. 6 is a diagram to explain an example of the operation sequence for moving a cargo by the forklift as a cargo-handling-vehicle.
Figure 6B:
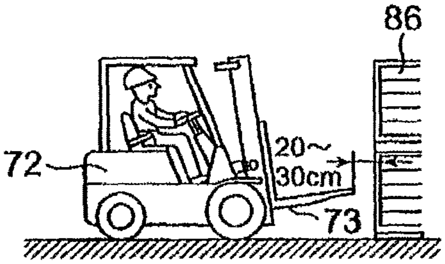
Figure 6C:
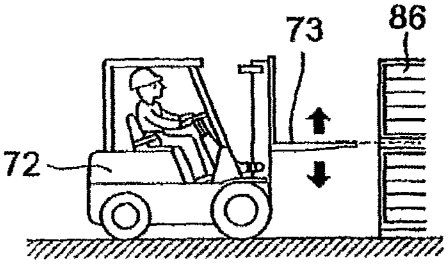
Figure 6D:
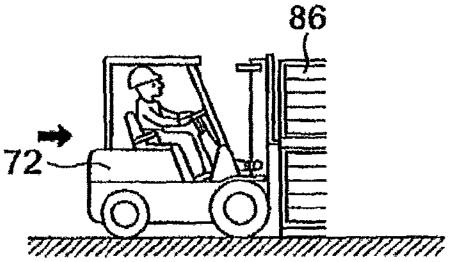
Figure 6E:
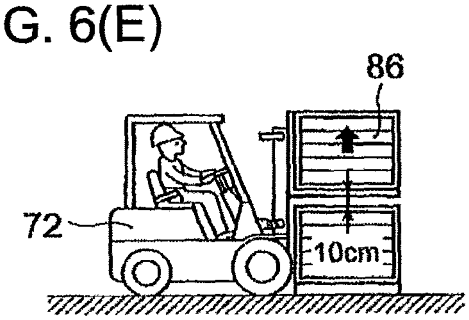
Figure 6F:
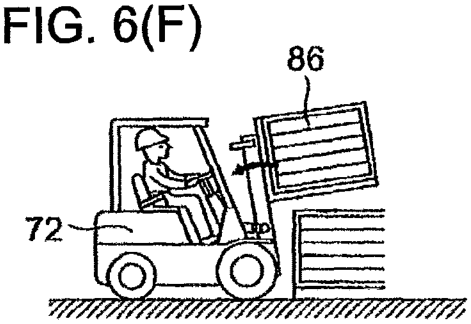
Figure 6G:
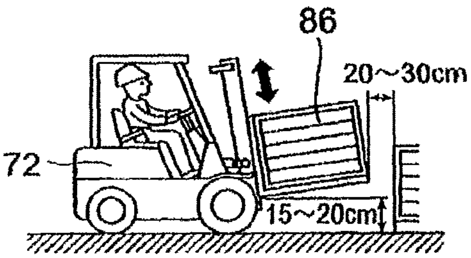
Figure 6H:
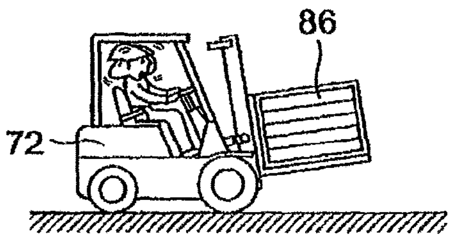

And as shown in FIG. 6(B), the vehicle stops temporarily with a distance of 20 to 30 cm between the cargo 86 and the front of the fork 73 facing each other, and the parking-brake lever 93 being moved to the lock position. Next, as shown in FIG. 6(C), the tilt lever 562 (95 in FIG. 5) is operated so as to move the backward-tilted mast to an upright position, the tilt-angle sensor 81 detecting the change of the tilt angle, and the detection single being sent to the control unit 50 via the I/O interface 52. The control unit 50 sends the detection signal to the calculation unit 59 so as to calculate a differential value, and comparing it with a threshold of a differential value of the tilt-angle change stored in the memory 60. If the calculated differential value exceeds the threshold, the control unit 50 refers to the vehicle speed sent from the speed sensor 57 so as to check that the main machine (engine or motor) is currently operated and the vehicle is not moving, and controlling the display to selectively display the upright symbol 213 of FIG. 1(C) to update the tilt symbol 21 in FIG. 1(B) as indicated by 32 of FIG. 2.

Subsequently, the operator operates the lift lever 561 (94 in FIG. 5) and thus the control unit 50 controls the hydraulic pressure control unit 51 as to apply hydraulic pressure to the lift cylinder 62, thereby raising the fork 73. The fork 73 is raised to the height of an insertion gap of the pallets, and the hydraulic pressure sensor 85 detects the change and sending the detection single to the control unit 50 via the I/O interface 52. Therefore, the control unit 50 sends the detection signal to the calculation unit 59 so as to calculate a differential value, i.e. the change of the cargo weight not less than a prescribed value, and if the change of the cargo weight is detected for a predetermined period of time, the differential value is compared with a threshold of a lift differential value stored in the memory 60. If the calculated differential value exceeds the threshold, the control unit 50 refers to the vehicle speed sent from the speed sensor 57 so as to check that the vehicle is not moving, and controlling the display to switch from the tilt angle (33 of FIG. 2) to the cargo weight (33 of FIG. 2), displaying the weight symbol 14 in the location shown as 21 in FIG. 1 (B). Moreover, the calculation unit 59 converts the hydraulic pressure of the hydraulic pressure sensor 85 to the weight of the cargo 86, and the converted cargo weight being displayed in the location indicated with 20 in FIG. 1 (B). In FIG. 1 (B), the cargo weight is zero as the cargo 86 is not lifted.

In the state, the parking-brake lever 93 is released and the forward-backward lever 92 being moved to the forward position so as to move forward slowly as shown in FIG. 6 (D). In this process, the vehicle speed does not exceed 4 km/hr, thus the load meter display 33 is not cleared, the fork 73 being inserted between the pallets, and the parking brake 93 being moved to the lock position. The lift lever 561 (94 in FIG. 5) is operated so as to lift the cargo 86 about 10 cm off the ground as shown in FIG. 6 (E), the hydraulic pressure sensor 85 detecting the change, sending the detection signal to the control unit 50 via the I/O interface 52. In a similar manner as the previous case, the control unit 50 sends the detection signal to the calculation unit 59 so as to calculate a differential value, and comparing it with a threshold of the lift differential value stored in the memory 60. If the calculated differential value exceeds the threshold, the control unit 50 refers to the vehicle speed sent from the speed sensor 57 so as to check that the vehicle is not moving and the vehicle speed is less than 4 km/hr, and controlling the display to maintain the load meter display (33 of FIG. 2), displaying the weight symbol 14 in the location shown as 21 in FIG. 1 (B). Moreover, the calculation unit 59 converts the hydraulic pressure of the hydraulic pressure sensor 85 to the weight of the cargo 86, and in this case as the cargo 86 being lifted, the calculated cargo weight is displayed in the area shown as 20.

Then, the tilt lever 562 (95 in FIG. 5) is pulled so as to tilt the mast backward as shown in FIG. 6 (F), and stabilizing the cargo 86. The tilt-angle sensor 81 detects the movement and the detection signal being sent to the control unit 50 via the I/O interface 52. In a similar manner as the previous cases, the control unit 50 sends the detection signal to the calculation unit 59 so as to calculate a differential value, and comparing it with a threshold of a differential value of the tilt-angle change stored in the memory 60. If the calculated differential value exceeds the threshold, the control unit 50 refers to the vehicle speed sent from the speed sensor 57 so as to check that the vehicle is not moving, and controlling the display 54 to display the tilt angle 20 of FIG. 1 (B) and the backward-tilt symbol 212 of FIG. 1(C) to update the tilt angle 21.

In this manner, the tilt angle and the load of the cargo (weight measurement from the lift movement) are measured. For example, when the various sensors 58 detects abnormalities including failure of the control unit such as CPU or failure of components such as the coolant temperature rising and hydraulic pressure drastically declining due to malfunction of the hydraulic pressure pump, the detection signal is sent to the control unit 50 via the I/O interface 52. In the next step as explained as 34 in the transition diagram of FIG. 2, the control unit 50 retrieves error codes corresponding to the detected abnormality from the memory 60, and controlling the display 54 to display the error indications in the area where the tilt angle 14 and the cargo weight 15 are shown in FIG. 1 (A). The aforesaid error indications are given the priority in any case of the normal driving state when the vehicle speed is not less than 4 km/hr, the initial driving state and the slow driving state when the tilt angle or the cargo weight is displayed. Consequently, it is not necessary to provide a separate display area for the error indications, and in the case of detecting abnormalities, the display promptly display the error indications.

Moreover, According to the transition diagram of FIG. 2, the tilt angle or the cargo weight is cleared once the vehicle speed becomes not less than 4 km/hr. However, this predetermined speed is a mere example and can be arbitrarily set. In reference to FIG. 2, when the vehicle speed becomes not less than 4 km/hr, i.e. the normal driving state, the tilt angle display or the cargo weight display is cleared, and when the vehicle speed returns to slower than 4 km/hr, i.e. the slow driving state, the tilt angle or the cargo weight whichever changes.

As explained above, the display device of the present invention for the cargo-handling vehicle, initially displays the tilt angle when turning on the vehicle, which allows the operator to recognize any existing problem before driving the vehicle and prompts the operator to drive in the order of the operating sequence. And when lifting the cargo, the cargo weight is displayed instead of the tilt angle so as to promote easy understanding of the total weight of the cargos being loaded onto a vehicle such as a truck. The tilt angle or the weight of the loaded cargo is displayed when the speed sensor detects the vehicle speed being not more than a predetermined speed, i.e. in the initial driving state and the slow driving state. Therefore, there is not such an error as displaying a wrong tilt angle or cargo weight affected by the vibration.

Furthermore, the tilt angle or the cargo weight is displayed when the tilt-angle sensor or the hydraulic pressure sensor detects the change of the pressure for tilting the mast forward or backward or the pressure for raising the fork to be not less than a predetermined value, when the change is detected for a predetermined period of time, or when the differential value calculated from the outputs of tilt angle sensor or the hydraulic pressure sensor exceeds the prescribed threshold. Therefore, the change of the tilt angle or the cargo weight when the operator operates the tilt lever or lift lever can be distinguished from the change of the same affected by the vibration from the ground, and there is no such error as displaying wrong tilt angle or cargo weight.

INDUSTRIAL APPLICABILITIES

The cargo-handling vehicle described in the present invention comprises a display device which prompts the operator to drive in the correct operation sequence, thereby achieving a safe driving of the cargo-handling vehicle.

The invention claimed is:

1. A display device for a cargo-handling vehicle which has a mast located at a front of the vehicle, the mast being capable of tilting a fork forward and backward around a support axis and moving the fork up and down, a tilt-angle detector detecting a tilt angle of the mast, and a cargo weight detector detecting weight of a cargo loaded on the fork, the display device comprising:

a display which displays speed of the cargo-handling vehicle, the tilt angle of the mast and the cargo weight; and a control unit which controls the display, wherein the display includes a speed display area displaying the speed of the cargo-handling vehicle and a selection display area which selectively displays the tilt angle and the weight outside the speed displaying area, wherein the control unit controls the display so that contents of the selection display area are changed depending on driving states of the cargo-handling vehicle including an initial driving state from turning on the cargo-handling vehicle to starting the vehicle, a slow driving state from staring the vehicle to reaching a prescribed speed and a normal driving state when the vehicle drives at the prescribed speed or higher, and wherein at least in the initial driving state, the selection display area displays the tilt angle detected when turning on the vehicle, and in the normal driving state, the selection display area displays only error indications.

2. The display device for the cargo-handling vehicle according to claim 1, wherein in the slow driving state, the selection display area displays either the tilt angle being currently detected by the tilt-angle detector or the cargo weight being detected by the cargo weight detector, and wherein the control unit controls the selection display area so as to display the tilt angle in priority to the cargo weight, the selection display area switching from the tilt angle to the cargo weight only when the cargo-weight detector detects a change of the cargo weight not less than a prescribed value.

3. The display device for the cargo-handling vehicle according to claim 1, wherein when returning from the normal driving state to the slow driving state, if one of the tilt angle and the cargo weight changes, the control unit controls the selection display area so as to display the one of the tilt angle and the cargo weight.

4. The display device for the cargo-handling vehicle according to claim 1, wherein the tilt angle displayed in the selection display area includes an image representing the tilt angle of the fork.

5. The display device for the cargo-handling vehicle according to claim 1, wherein the error indications are given the priority in any case of the initial driving state, the slow driving state or the normal driving state.

6. The display device for the cargo-handling vehicle according to claim 2, wherein the tilt angle displayed in the selection display area during the slow driving state is updated when a change component of a tilt-angle signal from the tilt-angle detector exceeds a prescribed threshold.

7. The display device for the cargo-handling vehicle according to claim 2, wherein the tilt angle displayed in the selection display area during the slow driving state is updated when the tilt-angle detector keeps detecting the tilt angle not less than a prescribed value for a predetermined period of time.

8. The display device for the cargo-handling vehicle, according to claim 1, wherein the cargo weight detector includes a hydraulic sensor which calculates the cargo weight from the hydraulic pressure moving the fork.

9. The display device for the cargo-handling vehicle according to claim 8, wherein the cargo weight displayed in the selection display area is determined based on the hydraulic pressure detected for a predetermined period of time, the hydraulic pressure corresponding to a static load of the cargo received on the fork.

10. The display device for the cargo-handling vehicle according to claim 1, wherein the display is switched to the loaded cargo weight when the cargo-weight detector keeps detecting the change of the cargo weight not less than a prescribed threshold for a predetermined period of time.

11. The display device for the cargo-handling vehicle according to claim 2, wherein when returning from the normal driving state to the slow driving state, if one of the tilt angle and the cargo weight changes, the control unit controls the selection display area so as to display the one of the tilt angle and the cargo weight.

12. The display device for the cargo-handling vehicle according to claim 2, wherein the tilt angle displayed in the selection display area includes an image representing the tilt angle of the fork.

13. The display device for the cargo-handling vehicle according to claim 2, wherein the error indications are given the priority in any case of the initial driving state, the slow driving state or the normal driving state.

14. The display device for the cargo-handling vehicle, according to claim 2, wherein the cargo weight detector includes a hydraulic sensor which calculates the cargo weight from the hydraulic pressure moving the fork.

15. The display device for the cargo-handling vehicle according to claim 2, wherein the display is switched to the loaded cargo weight when the cargo-weight detector keeps detecting the change of the cargo weight not less than a prescribed threshold for a predetermined period of time.

* * * * *